United States Patent [19]

Evans, Jr. et al.

[11] Patent Number: 5,635,770
[45] Date of Patent: Jun. 3, 1997

[54] FUELING SYSTEM STARTER INTERRUPT FOR AN ALTERNATE FUEL VEHICLE

[75] Inventors: Alan F. Evans, Jr., Rochester Hills; Garth J. Schultz, Troy, both of Mich.

[73] Assignee: Beacon Power Systems, Inc., Troy, Mich.

[21] Appl. No.: 497,143

[22] Filed: Jun. 30, 1995

[51] Int. Cl.⁶ ........................................... B60K 28/10
[52] U.S. Cl. .................... 307/10.6; 123/179.3; 180/286; 220/86.2; 220/DIG. 33
[58] Field of Search ....................... 307/9.1, 10.1, 307/10.3, 10.6; 361/215, 216; 123/179.3, 198 DB, 198 DC; 70/242–244; 180/271, 286; 220/86.2, DIG. 33, 746; 340/438, 450.2

[56] References Cited

U.S. PATENT DOCUMENTS

| | | | |
|---|---|---|---|
| 3,652,868 | 3/1972 | Hunt | 307/9.1 |
| 3,885,547 | 5/1975 | Doepke et al. | 307/9.1 |
| 4,319,303 | 3/1982 | Thorn | 361/215 |
| 4,369,745 | 1/1983 | Howard | 123/198 DC |
| 4,540,191 | 9/1985 | Hoch | 361/215 |
| 4,591,675 | 5/1986 | Sessum | 200/52 R |
| 4,668,874 | 5/1987 | Cresap | 307/10.6 |
| 4,815,436 | 3/1989 | Sasaki et al. | 220/746 |
| 5,291,067 | 3/1994 | Nakajima et al. | 307/9.1 |
| 5,402,763 | 4/1995 | Saito et al. | 123/179.21 |

Primary Examiner—Richard T. Elms
Attorney, Agent, or Firm—Brooks & Kushman P.C.

[57] ABSTRACT

An apparatus is disclosed for interrupting operation of a starter of an alternatively-fueled motor vehicle. The apparatus comprises a fuel receptacle, a cover and a switch. The fuel receptacle has an electrically conductive, grounded fill opening. The cover mates with the fill opening of the fuel receptacle, and has a contact sensor which generates a ground signal indicative of contact between the cover and the fill opening. The switch communicates with the contact sensor and with the starter, and interrupts operation of the starter when no signal indicative of contact is received from the contact sensor.

15 Claims, 3 Drawing Sheets

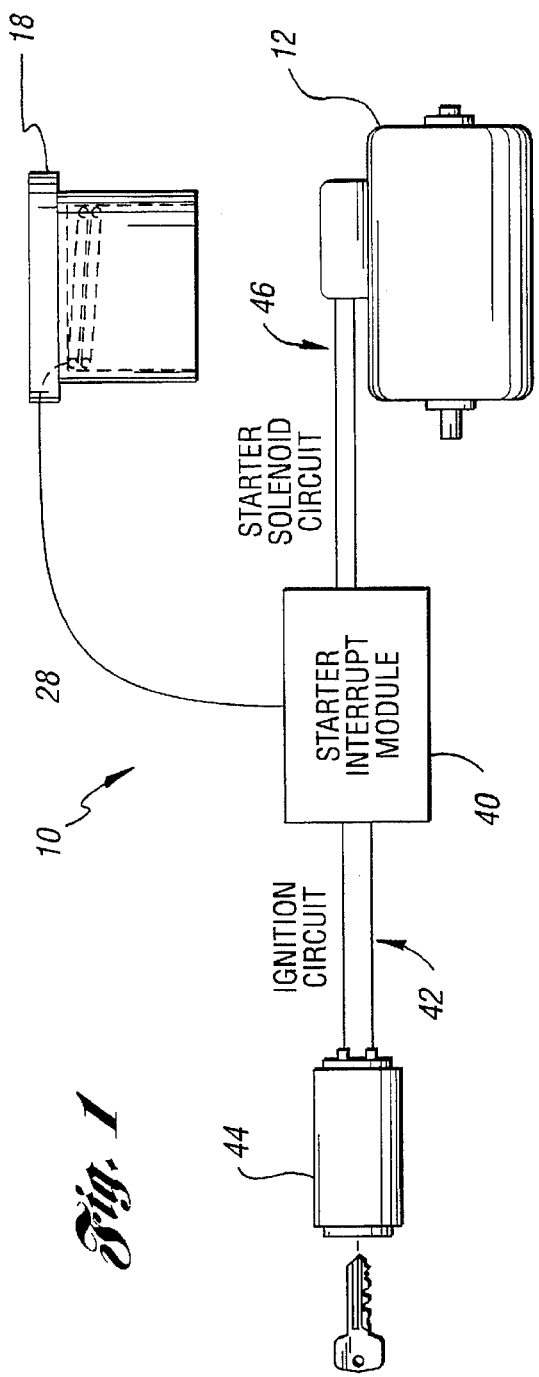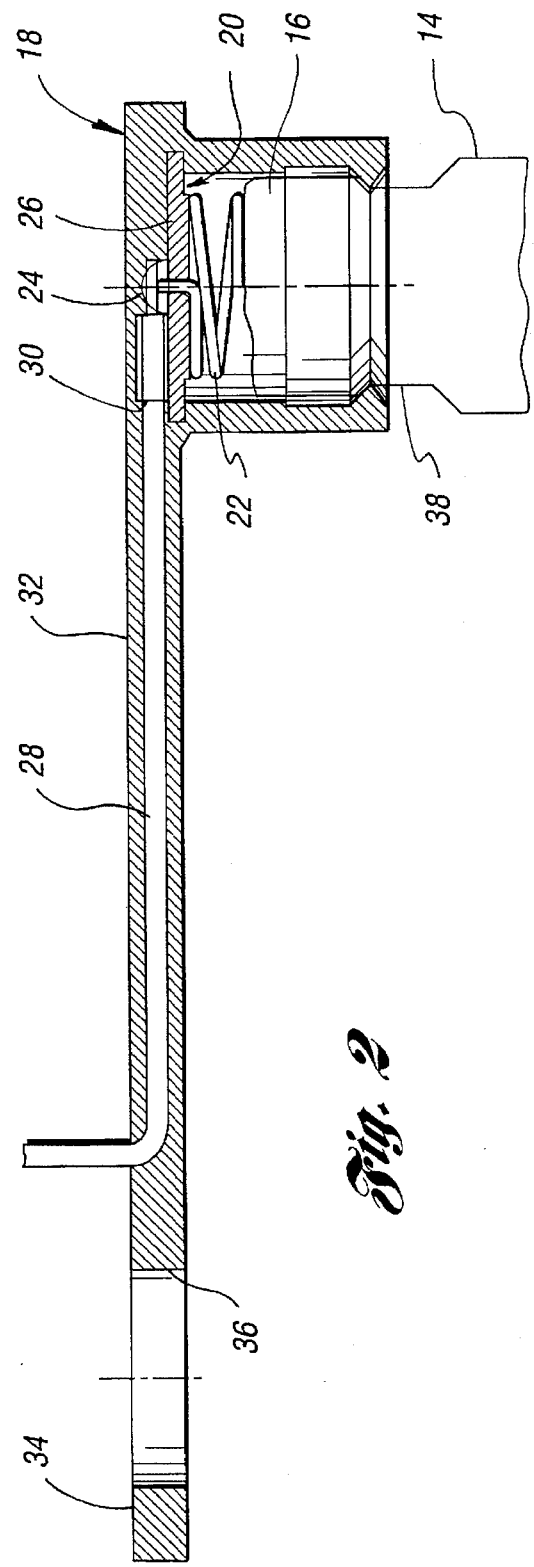

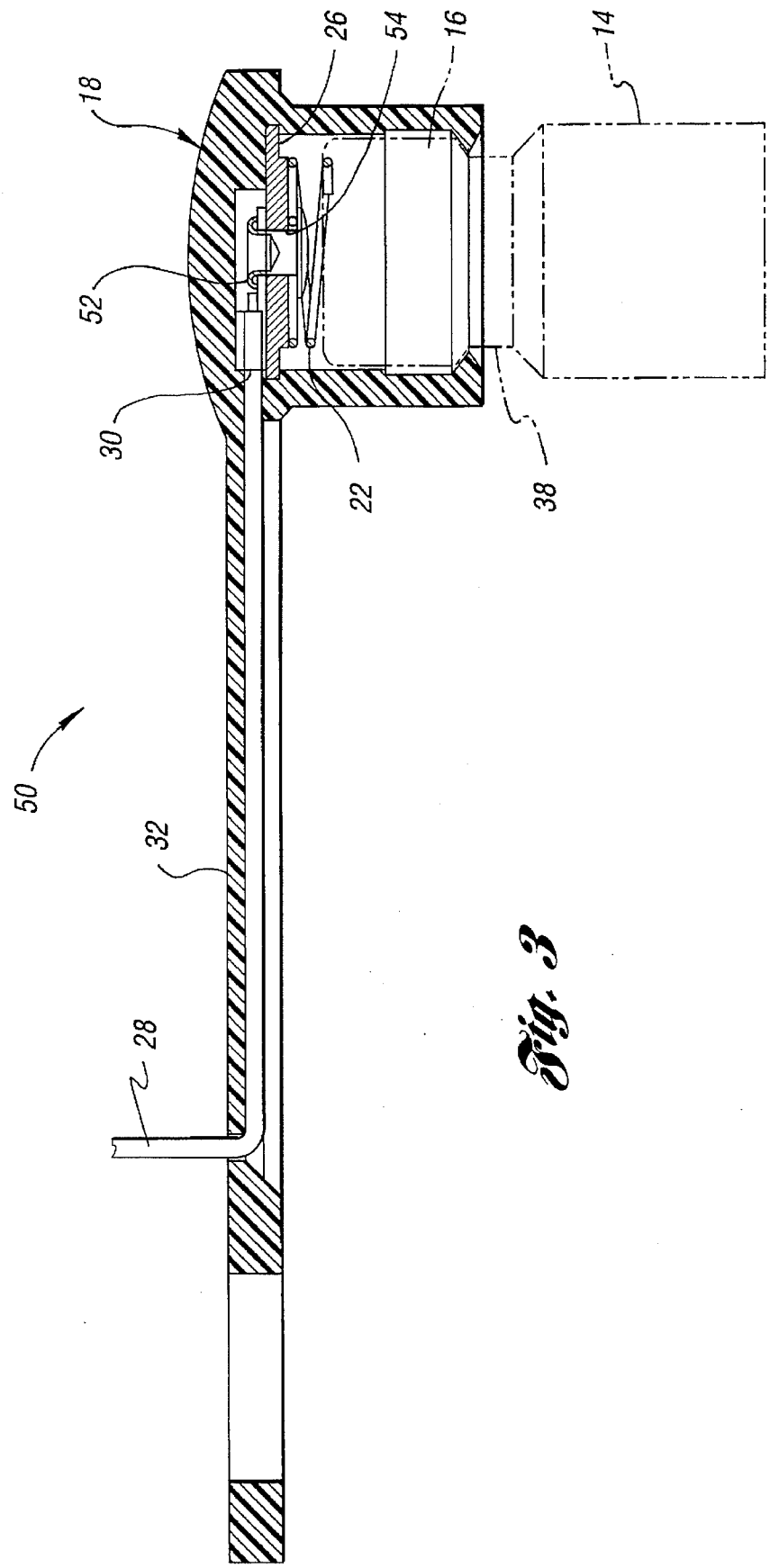

1

FUELING SYSTEM STARTER INTERRUPT FOR AN ALTERNATE FUEL VEHICLE

TECHNICAL FIELD

This invention relates to an apparatus for interrupting operation of a starter of an alternatively-fueled motor vehicle.

BACKGROUND ART

Alternatively-fueled motor vehicles, i.e. those which operate solely or partially on a fuel other than gasoline or diesel fuel, are proliferating. Most such alternate fuel vehicles have their fuel supplies replenished at a stationary filling facility having a fuel hose which tightly mates with the vehicle's fuel receptacle. In such situations, the potential exists for the operator to start the vehicle and drive away with the fuel hose still connected to the fuel receptacle. Even if the operator has removed the fuel hose, however, failure to replace a cover on the receptacle may allow containinants to accumulate on the receptacle that can subsequently enter the fuel system, causing damage to downstream components.

In some alternatively-fueled vehicles, a mechanical sensor or switch is provided to deactivate the starter circuit by sensing the presence of a fill nozzle on the receptacle. While these devices ensure that the fill nozzle is removed before the vehicle is driven away, they do not simultaneously require replacement of the protective cover. In addition, because of the wide variety of nozzle styles, these mechanical devices may not function properly with all variations of the nozzles, and they have the added problem that exposure to snow, ice and other outdoor elements can render them inoperable.

SUMMARY OF THE INVENTION

The present invention is an apparatus for controlling start up of an alternatively-fueled motor vehicle, comprising a cover and a switch in communication with the cover. The cover is adapted to contact an opening of a fuel receptacle. The switch is adapted to receive a signal indicative of contact between the cover and the opening of the fuel receptacle, and to inhibit start up of the motor vehicle when the signal is not received.

Accordingly, it is an object of the present invention to provide an apparatus of the type described above which interrupts starting of an alternatively-fueled motor vehicle while the vehicle is being fueled.

Another object of the present invention is to provide an apparatus of the type described above which interrupts starting an alternatively-fueled motor vehicle while a cover is not in place on a fill receptacle.

These and other objects, features, and advantages of the present invention are readily apparent from the following detailed description of the best mode for carrying out the invention when taken in conjunction with the accompanying drawings.

BRIEF DESCRIPTION OF THE DRAWINGS

FIG. 1 is a schematic view of an apparatus according to the present invention for interrupting operation of a starter of an alternatively-fueled motor vehicle;

FIG. 2 is a cross-sectional view of a protective cover of the apparatus;

FIG. 3 is a cross-sectional view of an alternative embodiment of the protective cover.

BEST MODE FOR CARRYING OUT THE INVENTION

Figure 4:
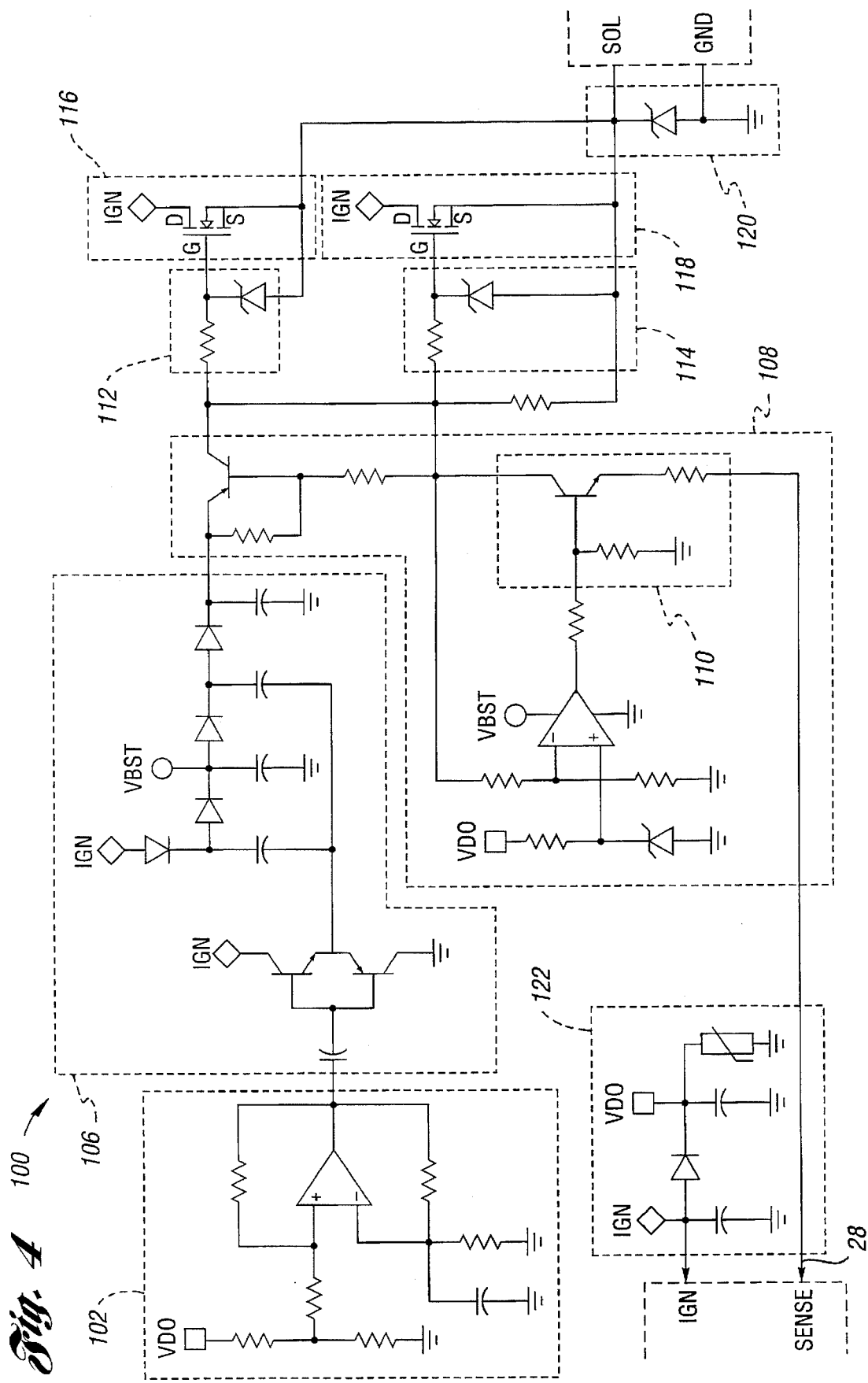
FIG. 4 is a schematic view of an electrical circuit of a starter interrupt module of the apparatus.

With reference to the drawings, the preferred embodiments of the present invention will be described. FIGS. 1 and 2 show an apparatus 10 according to the present invention for interrupting operation of a starter 12 of an alternatively-fueled motor vehicle. The apparatus 10 comprises a fuel receptacle 14 for storing an alternative fuel such as compressed natural gas (CNG), liquified natural gas (LNG) or liquified propane. The fuel receptacle 14 has an electrically conductive fill opening 16, through which the alternative fuel is normally introduced into the fuel receptacle. The fill opening 16 is connected to the vehicle chassis, which in turn is connected to the negative terminal of the vehicle battery.

A protective rubber cap or cover 18 adapted to mate with the fill opening 16 of the fuel receptacle 14 is provided having a contact sensor 20. In a preferred embodiment, the contact sensor 20 comprises a coil spring 22 having a first free end and a second end soldered at a point 24 to an electrically conductive plate 26. From the solder point 24, a signal wire 28 extends through a strain relief ring terminal 30 and a flexible rubber casing 32. The distal end 34 of the extension 32 has an opening 36 which can be mounted around the neck 38 of the fill opening 16, prior to the mounting of the cover 18, to prevent inadvertent loss of the cover during fueling. FIG. 3 shows an alternative embodiment 50 of the present invention in which the spring 22 is retained against the cover plate 26 by a rivet 52 that extends through a central opening 54 in the cover plate.

In either of the embodiments shown in FIGS. 2 and 3, the contact sensor 20 is preferably configured such that only by fully replacing the cover 18 onto the metallic fill opening 16 will the free end of the spring 22 come into contact with the top of the fill opening. When contact is made, the contact sensor 20 generates a ground signal indicative of contact between the cover 18 and the fill opening 16. The substantially zero voltage ground signal is transmitted through the signal wire 28 to a starter interrupt module 40. The starter interrupt module 40 is situated in the vehicle between an ignition circuit 42 including a key cylinder 44 and a starter solenoid circuit 46 which includes the starter 12.

FIG. 4 shows a preferred circuit 100 for accomplishing solid state switching of the high currents associated with the starter solenoid circuit 46. A 40 KHz charge pump oscilator 102 drives a charge pump voltage tripler 106. The charge pump 106 develops a voltage great enough to turn on a pair of N-channel MOSFET gates G in a high side switch configuration. A MOSFET gate drive voltage regulator 108 limits the MOSFET gate drive voltage when the vehicle battery is near +12 volts, and a protective cover enable circuit 110 enables the MOSFET gate drive voltage regulator.

A pair of MOSFET current drive limiters 112 and 114 limit the gate source voltage on the MOSFET, which protects the gate from over voltage and limits the maximum current of the MOSFET. Two N-channel MOSFET power drivers 116 and 118 are provided in parallel and configured in a high side switch mode. A solenoid back EMF channel clamp 120 is also provided in the form of a diode that clamps the back EMF of the starter solenoid and collapses the magnetic field of its coil. Finally, a circuit power supply filter 122 protects voltage-sensitive components from damage.

When the signal wire 28 is grounded, the solid-state switch 100 closes and enables current flow from the ignition signal IGN to the starter solenoid signal SOL to permit operation of the vehicle starter 12. When the signal wire 28 is disconnected from ground, the switch 100 is open. This prevents current flow from the ignition signal IGN to the the starter solenoid signal SOL, which disables vehicle starting.

The switch 100 can be placed on a circuit board mounted in a small weatherproof housing, and spliced into the starter solenoid circuit 46 of the vehicle in a suitable location. Thereafter, power to the starter 12 is interrupted until the cover 18 is replaced on the fill opening 16.

It should be understood that while the forms of the invention herein shown and described constitute preferred embodiments of the invention, they are not intended to illustrate all possible forms thereof. It should also be understood that the words used are words of description rather than limitation, and various changes may be made without departing from the spirit and scope of the invention disclosed.

What is claimed is:

1. Apparatus for controlling start up of a motor vehicle, the apparatus comprising:

a fuel receptacle having an opening;

a cover having a contact sensor in selective contact with the opening, the contact sensor generating a ground signal indicative of such contact; and a switch in communication with the contact sensor, the switch inhibiting start up of the motor vehicle when the signal is not received.

2. The apparatus of claim 1 wherein the switch is disposed in an electrical circuit including a starter for the motor vehicle.

3. The apparatus of claim 1 wherein the signal is transmitted by a wire extending between the cover and the switch.

4. The apparatus of claim 1 wherein the opening of the fuel receptacle is grounded.

5. The apparatus of claim 1 wherein the opening of the fuel receptacle comprises an electrically conductive material.

6. The apparatus of claim 1 wherein the opening of the fuel receptacle comprises metal.

7. The apparatus of claim 1 wherein the contact sensor comprises a coil spring.

8. Apparatus for interrupting operation of a starter of an alternatively-fueled motor vehicle, the apparatus comprising:

a fuel receptacle having a fill opening;

a cover having a contact sensor which generates a signal indicative of contact between the cover and the fill opening; and a switch in communication with the contact sensor and with the starter, the switch interrupting operation of the starter when no signal indicative of contact is received from the contact sensor.

9. The apparatus of claim 8 wherein the signal is transmitted by a wire extending between the contact sensor and the switch.

10. The apparatus of claim 8 wherein the signal is a ground signal.

11. The apparatus of claim 8 wherein the fill opening of the fuel receptacle is grounded.

12. The apparatus of claim 8 wherein the fill opening of the fuel receptacle comprises an electrically conductive material.

13. The apparatus of claim 8 wherein the fill opening of the fuel receptacle comprises metal.

14. The apparatus of claim 8 wherein the contact sensor comprises a coil spring.

15. Apparatus for interrupting operation of a starter of an alternatively-fueled motor vehicle, the apparatus comprising:

a fuel receptacle having an electrically conductive, grounded fill opening;

a cover adapted to mate with the fill opening of the fuel receptacle, the cover having a contact sensor which generates a ground signal indicative of contact between the cover and the fill opening; and a switch in electrical communication with the contact sensor and with the starter, the switch interrupting operation of the starter when no signal indicative of contact is received from the contact sensor.

* * * * *